United States Patent
Yang et al.

(10) Patent No.: US 10,461,988 B2
(45) Date of Patent: Oct. 29, 2019

(54) SWITCHING NETWORK SYNCHRONIZATION METHOD, SWITCHING DEVICE, ACCESS DEVICE AND STORAGE MEDIUM

(71) Applicant: Sanechips Technology Co., Ltd., Shenzhen, Guangdong (CN)

(72) Inventors: Guobin Yang, Shenzhen (CN); Fengming Xu, Shenzhen (CN); Ning Gao, Shenzhen (CN); Yue Feng, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 77 days.

(21) Appl. No.: 15/564,898

(22) PCT Filed: May 26, 2016

(86) PCT No.: PCT/CN2016/083561
§ 371 (c)(1),
(2) Date: Oct. 6, 2017

(87) PCT Pub. No.: WO2016/206516
PCT Pub. Date: Dec. 29, 2016

(65) Prior Publication Data
US 2018/0097683 A1   Apr. 5, 2018

(30) Foreign Application Priority Data
Jun. 26, 2015   (CN) .......................... 2015 1 0366389

(51) Int. Cl.
*G06F 15/16*   (2006.01)
*H04L 29/08*   (2006.01)
(Continued)

(52) U.S. Cl.
CPC ............ *H04L 29/08* (2013.01); *H04J 3/0602* (2013.01); *H04L 12/56* (2013.01); *H04L 51/00* (2013.01); *H04L 67/2861* (2013.01); *H04L 45/02* (2013.01)

(58) Field of Classification Search
CPC ......... H04L 29/08; H04L 12/56; H04L 51/00; H04L 67/2861; H04J 3/0602
See application file for complete search history.

(56) References Cited

U.S. PATENT DOCUMENTS

| | | | |
|---|---|---|---|
| 5,467,347 A | 11/1995 | Petersen | |
| 6,532,212 B1 * | 3/2003 | Soloway | ................. H04L 45/00 370/230 |

(Continued)

FOREIGN PATENT DOCUMENTS

| | | |
|---|---|---|
| CN | 1386021 A | 12/2002 |
| CN | 1551564 A | 12/2004 |

(Continued)

OTHER PUBLICATIONS

US 5,361,257 A, 11/1994, Petersen (withdrawn)
(Continued)

*Primary Examiner* — Jonathan A Bui
(74) *Attorney, Agent, or Firm* — Ling Wu; Stephen Yang; Ling and Yang Intellectual Property

(57) ABSTRACT

Disclosed is a switching network synchronization method, which is applied to a first switching device. The method comprises: receiving a first suspected target ID; the first suspected target ID being an ID corresponding to a suspected target switching device determined by an access device connected to the first switching device according to a first identity number ID; receiving via the access device a second suspected target ID sent by a second switching device; the second suspected target ID being an ID corresponding to a suspected target switching device determined
(Continued)

by the second switching device; determining a first target ID according to the first suspected target ID and the second suspected target ID; and the first target ID being an ID corresponding to a target switching device. Also disclosed is a first switching device, an access device and a storage medium.

10 Claims, 8 Drawing Sheets

(51) Int. Cl.
*H04L 12/58* (2006.01)
*H04J 3/06* (2006.01)
*H04L 12/54* (2013.01)
*H04L 12/751* (2013.01)

(56) References Cited

U.S. PATENT DOCUMENTS

| | | | |
|---|---|---|---|
| 7,095,713 B2 | 8/2006 | Willhite | |
| 7,366,166 B2 | 4/2008 | Willhite | |
| 7,633,861 B2 | 12/2009 | Willhite | |
| 7,633,883 B2 * | 12/2009 | Cho | H04L 12/4641 370/252 |
| 7,660,239 B2 | 2/2010 | Willhite | |
| 8,040,888 B1 * | 10/2011 | MacAdam | H04L 12/6418 370/389 |
| 8,194,653 B2 | 6/2012 | Willhite | |
| 8,462,794 B2 * | 6/2013 | Dobbins | H04L 12/1886 370/395.2 |
| 8,615,015 B1 * | 12/2013 | Shekhar | H04L 45/54 370/256 |
| 8,705,544 B2 | 4/2014 | Iny | |
| 9,154,425 B2 | 10/2015 | Iny et al. | |
| 9,319,317 B1 * | 4/2016 | Spadaro | H04L 45/745 |
| 2004/0213148 A1 | 10/2004 | Willhite | |
| 2004/0213151 A1 | 10/2004 | Willhite | |
| 2004/0213217 A1 | 10/2004 | Willhite | |
| 2004/0213266 A1 | 10/2004 | Willhite | |
| 2004/0213292 A1 | 10/2004 | Willhite | |
| 2005/0091381 A1 * | 4/2005 | Sunder Rajan | H04L 29/12122 709/227 |
| 2005/0094568 A1 * | 5/2005 | Judd | H04L 12/56 370/242 |
| 2006/0245422 A1 | 11/2006 | Willhite | |
| 2007/0097880 A1 | 5/2007 | Rajsic | |
| 2008/0107120 A1 | 5/2008 | Willhite | |
| 2008/0151880 A1 | 6/2008 | Willhite | |
| 2008/0186968 A1 * | 8/2008 | Farinacci | H04L 12/4633 370/392 |
| 2011/0096790 A1 * | 4/2011 | Sugai | H04L 49/10 370/412 |
| 2011/0280572 A1 | 11/2011 | Vobbilisetty | |
| 2012/0230342 A1 | 9/2012 | Iny | |
| 2013/0094510 A1 | 4/2013 | Tan | |
| 2014/0130044 A1 * | 5/2014 | Zhang | G06F 9/45533 718/1 |
| 2014/0140214 A1 | 5/2014 | Iny et al. | |
| 2015/0234619 A1 * | 8/2015 | Ozawa | G06F 3/067 710/74 |
| 2016/0380876 A1 * | 12/2016 | Calciu | H04L 45/54 370/254 |
| 2017/0070364 A1 * | 3/2017 | Suzuki | H04L 12/4641 |

FOREIGN PATENT DOCUMENTS

| | | |
|---|---|---|
| CN | 101599824 A | 12/2009 |
| CN | 102246443 A | 11/2011 |
| CN | 102684990 A | 9/2012 |
| CN | 103078700 A | 5/2013 |
| EP | 1835673 A1 | 9/2007 |
| EP | 1489796 A3 | 1/2011 |
| EP | 1835673 B1 | 6/2011 |
| EP | 1489796 B1 | 2/2012 |
| EP | 2530881 A1 | 12/2012 |
| JP | H03250829 A | 11/1991 |
| JP | H08505991 A | 6/1996 |
| JP | 2009296595 A | 12/2009 |
| WO | 2007049159 A2 | 5/2007 |

OTHER PUBLICATIONS

International Search Report in international application No. PCT/CN2016/083561, dated Aug. 29, 2016, 4 pgs.
English Translation of the Written Opinion of the International Search Authority in international application No. PCT/CN2016/083561, dated Aug. 29, 2016, 6 pgs.
Supplementary European Search Report in European application No. 16813632.3, dated Feb. 21, 2018, 10 pgs.

* cited by examiner

SWITCHING NETWORK SYNCHRONIZATION METHOD, SWITCHING DEVICE, ACCESS DEVICE AND STORAGE MEDIUM

TECHNICAL FIELD

The disclosure relates to a large-volume data switching technology, and particularly to a switching network synchronization method, a switching device, an access device and a storage medium.

BACKGROUND

A switching network implements data switching between access devices in a switching system. The switching network includes a single-stage switching network. Here, switching devices and access devices included in the single-stage switching network are connected through a fixed number of links, and are simply networked, so that the single-stage switching network is widely applied.

However, an existing information synchronization manner for a single-stage switching network may merely solve a synchronization problem of a fixedly connected switching network, but cannot solve a synchronization problem of a switching network of which the topology may be changed due to a link change. Therefore, troubles are brought to information synchronization, causing reduction of the switching capability and bandwidth waste.

SUMMARY

In order to solve the existing technical problem, in embodiments of the disclosure, a switching network synchronization method, a switching device, an access device and a storage medium are provided, which solve the problem of not being able to implement synchronization of complex and changeable switching network information and may lay a foundation for further improving a switching capability of a switching network and increasing a utilization rate of a bandwidth.

The technical solutions of the embodiments of the disclosure are implemented as follows.

The embodiments of the disclosure provide a switching network synchronization method, which may be applied to a first switching device, the method including that:

a first suspected target Identity (ID) is received, the first suspected target ID being an ID corresponding to a suspected target switching device determined by an access device connected with the first switching device according to a first ID;

a second suspected target ID sent by a second switching device is received through the access device, the second suspected target ID being an ID corresponding to a suspected target switching device determined by the second switching device; and a first target ID is determined according to the first suspected target ID and the second suspected target ID, the first target ID being an ID corresponding to a target switching device.

In the solution, the method may further include that:
whether the first ID corresponding to the first switching device is identical to the first target ID or not is judged; and when NO, a first access device in access devices connected with the first switching device is selected as an information synchronization device to enable the first switching device to perform information synchronization with the target switching device through the information synchronization device.

In the solution, the method may further include that:

the first target ID is sent to another access device, except the information synchronization device, connected with the first switching device to enable the other access device except the information synchronization device to implement an information synchronization process with the target switching device through the first target ID.

In the solution, the method may further include that:

the first switching device sends a control instruction to the second switching device through the access device, the control instruction being arranged to control the second switching device to implement an information synchronization process with the target switching device through path information in the control instruction.

In the solution, the method may further include that:

the first switching device sends the control instruction to the second switching device through the access device to enable the second switching device to determine an information synchronization path according to the path information in the control instruction.

The embodiments of the disclosure further provide a switching network synchronization method, which may be applied to an access device, the method including that:

a first ID sent by at least one switching device is received;

a first suspected target ID is determined according to the received at least one first ID, the first suspected target ID being arranged to represent an ID corresponding to a suspected target switching device; and the first suspected target ID is sent.

In the solution, the method may further include that:

a first target ID sent by a switching device is received, the first target ID being arranged to represent an ID corresponding to a target switching device; and the access device is controlled to implement an information synchronization process with the target switching device through the first target ID.

The embodiments of the disclosure further provide a first switching device, which may include:

a first receiving unit, arranged to receive a first suspected target ID, the first suspected target ID being an ID corresponding to a suspected target switching device determined by an access device connected with the first switching device according to a first ID;

a second receiving unit, arranged to receive a second suspected target ID sent by a second switching device through the access device, the second suspected target ID being an ID corresponding to a suspected target switching device determined by the second switching device; and a first determination unit, arranged to determine a first target ID according to the first suspected target ID and the second suspected target ID, the first target ID being an ID corresponding to a target switching device.

In the solution, the first switching device may further include:

a judgment unit, arranged to judge whether the first ID corresponding to the first switching device is identical to the first target ID or not; and a first control unit, arranged to, when NO, select a first access device in access devices connected with the first switching device as an information synchronization device to enable the first switching device to perform information synchronization with the target switching device through the information synchronization device.

In the solution, the first switching device may further include:

a first sending unit, arranged to send the first target ID to another access device, except the information synchronization device, connected with the first switching device to enable the other access device except the information synchronization device to implement an information synchronization process with the target switching device through the first target ID.

In the solution, the first switching device may further include:

a second control unit, arranged to send a control instruction to the second switching device through the access device, the control instruction being arranged to control the second switching device to implement an information synchronization process with the target switching device through path information in the control instruction.

In the solution, the second control unit may further be arranged to send the control instruction to the second switching device through the access device to enable the second switching device to determine an information synchronization path according to the path information in the control instruction.

The embodiments of the disclosure further provide an access device, which may include:

a third receiving unit, arranged to receive a first ID sent by at least one switching device;

a second determination unit, arranged to determine a first suspected target ID according to the received at least one first ID, the first suspected target ID being arranged to represent an ID corresponding to a suspected target switching device; and a second sending unit, arranged to send the first suspected target ID.

In the solution, the access device may further include:

a fourth receiving unit, arranged to receive a first target ID sent by a switching device, the first target ID being arranged to represent an ID corresponding to a target switching device; and a third control unit, arranged to control the access device to implement an information synchronization process with the target switching device through the first target ID.

According to the switching network synchronization method, switching device, access device and storage medium of the embodiments of the disclosure, the first suspected target ID is received through the first switching device, the second suspected target ID sent by the second switching device is received through the access device, and the first target ID is determined according to the first suspected target ID and the second suspected target ID, the first target ID being the ID corresponding to the target switching device, so that a purpose of enabling the first switching device to receive the second suspected target ID sent by the other switching device is achieved, and thereby the first switching device may conveniently determine the unique first target ID corresponding to a switching network, and a foundation is laid for information synchronization of all devices in the switching network.

DETAILED DESCRIPTION

Figure 1:
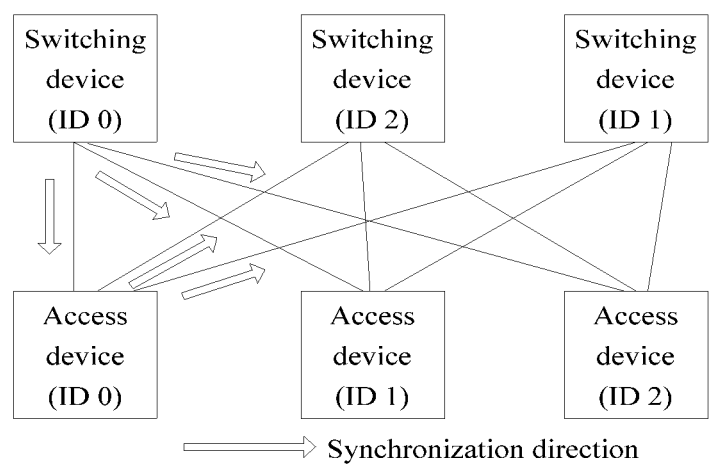
FIG. 1 is a first schematic diagram of an information synchronization direction corresponding to an existing single-stage switching network.

FIG. 1 is a first schematic diagram of an information synchronization direction corresponding to an existing single-stage switching network. As shown in FIG. 1, the single-stage switching network includes three switching devices and three access devices. Each device is provided with a respective ID; and specifically, the IDs corresponding to the three switching devices are: switching device ID 0, switching device ID 1 and switching device ID 2 respectively, and the IDs corresponding to the three access devices are: access device ID 0, access device ID 1 and access device ID 2 respectively. During practical application, there may be merely one reference in a switching system corresponding to the single-stage switching network, that is, all devices in the switching system are required to perform information synchronization with the same reference switching device, and in such a manner, information synchronization of the whole switching system can be ensured.

In the single-stage switching network, in an existing synchronization manner, the switching device with the minimum ID is selected as the reference switching device of the switching system and the access device also selects the switching device, with the minimum ID, connected with the access device as a synchronization object. Specifically, as shown in FIG. 1, each of the switching devices and each of the access devices are connected through a link, all the access devices may implement information synchronization with the switching device with the ID 0, and the other switching devices except the switching device with the ID 0, such as the switching devices with the IDs 1 and 2, may implement synchronization with the access device with the ID 0. By such a synchronization process, the information synchronization process of the switching system may be implemented.

Figure 2:
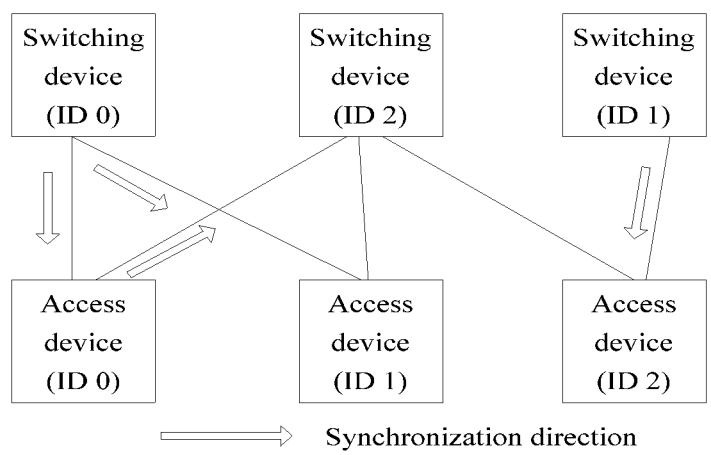
FIG. 2 is a second schematic diagram of an information synchronization direction corresponding to an existing single-stage switching network.

FIG. 2 is a second schematic diagram of an information synchronization method corresponding to an existing single-stage switching network. As shown in FIG. 2, the single-stage switching network also includes three switching devices and three access devices, the ID provided for each device is similar to that in FIG. 1, but the connecting manner between the devices is different from that in FIG. 1. The links between the switching device ID 1 and each of the access device ID 0 and the access device ID 1 are broken, a link between the access device ID 2 and the switching device ID 0 is broken, and in such a manner, according to the synchronization manner shown in FIG. 1, the access device ID 0 and the access device ID 1 may implement synchronization with the switching device ID 0, and the switching device ID 2 may implement information synchronization with the switching device ID 0 through the access device ID 0. Here, the access device ID 2 is merely connected with the switching device ID 1 and the switching device ID 2, so that the access device 2 may just implement information synchronization with the switching device ID 1. Therefore, the access device ID 2 and the switching device ID 1 may not implement information synchronization with the switching device ID 0, and two synchronization subsystems exist in the switching system, which may cause accumulation of data cells in the switching devices and reduce capacity of the switching network.

In order to solve the problem, in the embodiments of the disclosure, a switching network synchronization method and devices thereof are provided. Specifically, a basic thought of the embodiment of the disclosure is that: a first switching device receives a first suspected target ID; the first switching device receives a second suspected target ID sent by a second switching device through an access device; and the first switching device determines a first target ID according to the first suspected target ID and the second suspected target ID, the first target ID being an ID corresponding to a target switching device. Therefore, the first switching device may receive the second suspected target ID sent by the other switching device, and thus the first switching device may conveniently determine the unique first target ID corresponding to a switching network, thereby laying a foundation for implementing information synchronization of all devices in the switching network.

In order to make the characteristics and technical contents of the disclosure understood in more detail, implementation of the disclosure will be elaborated below with reference to the drawings. The appended drawings are provided as references, and are not intended to limit the disclosure.

Embodiment One

Figure 3:
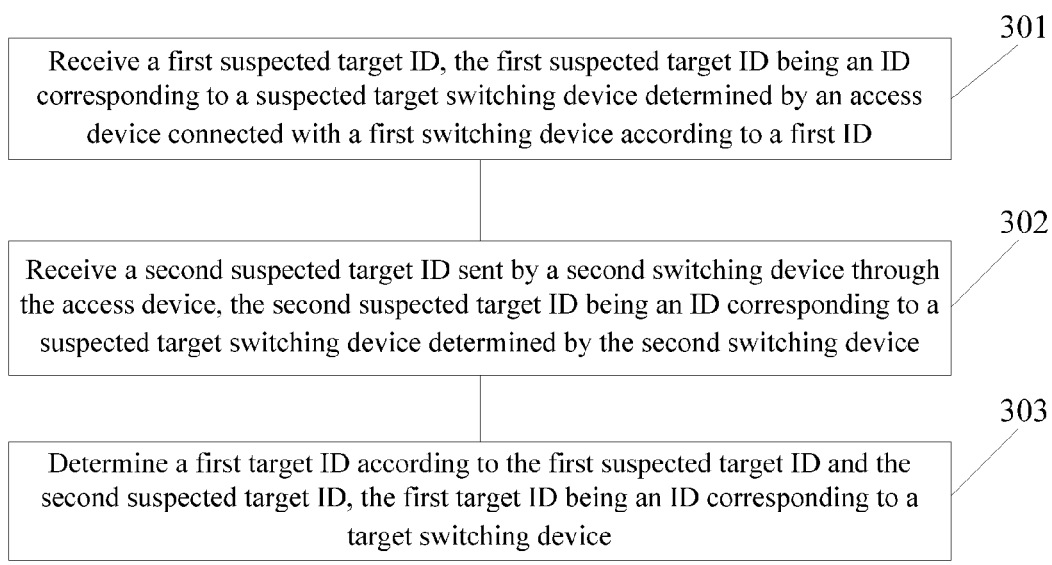
FIG. 3 is a first implementation flowchart of a switching network synchronization method according to an embodiment of the disclosure.

FIG. 3 is a first implementation flowchart of a switching network synchronization method according to an embodiment of the disclosure. The method is applied to a first switching device. The first switching device is connected with at least one access device, and the first switching device may be connected with a second switching device through the access device. As shown in FIG. 3, the method includes the following steps.

In Step 301, a first suspected target ID is received, the first suspected target ID being an ID corresponding to a suspected target switching device determined by an access device connected with the first switching device according to a first ID.

In the embodiment, the first switching device sends its own first ID to the at least one access device connected with the first switching device. Since the access device is not only connected with the first switching device, and during a practical application, the access device may be connected with multiple switching devices, the access device may receive a first ID sent by at least one switching device, and when the access device receives the at least one first ID, the access device selects the first suspected target ID from all the received first ID according to a first preset rule, and then sends the selected first suspected target ID to the switching device connected with it, i.e. the first switching device in the embodiment, and then the first switching device may acquire the first suspected target ID. Here, the first preset rule may specifically be an ID minimum principle, and specifically, the access device selects the minimum ID from all the received first ID as the first suspected target ID.

In Step 302, a second suspected target ID sent by the second switching device is received through the access device, the second suspected target ID being an ID corresponding to a suspected target switching device determined by the second switching device.

In the embodiment, the second switching device also sends its own corresponding first ID to an access device connected with it. Similarly, the access device selects a first suspected target ID from all first IDs received by itself according to the first preset rule, and then sends the selected first suspected target ID to the switching device connected with it, i.e. the second switching device, and then the second switching device may determine the second suspected target ID according to the first suspected target ID received by itself and send the second suspected target ID determined by itself to another switching device, i.e. the first switching device in the embodiment, through the access device, so that the first switching device may determine a target switching device in own corresponding switching network.

In Step 303, a first target ID is determined according to the first suspected target ID and the second suspected target ID, the first target ID being an ID corresponding to a target switching device.

In the embodiment, the first switching device may determine the first target ID according to the first suspected target ID and the second suspected target ID when receiving the first suspected target ID and the second suspected target ID, so that a foundation is laid for the first switching device to determine a target switching object corresponding to the first switching device's own corresponding switching network, and thus the whole switching network has a unified reference for implementation of information synchronization of all equipment in the switching network.

In the embodiment, the first switching device may receive the second suspected target ID sent by the other switching device in the first switching device's own corresponding switching network, so that the first switching device may take the second suspected target ID as a reference, and thus a foundation for finally determining a unique target switching device of the switching network corresponding to the first switching device is laid, and a foundation for implementing the information synchronization in the whole switching network is laid.

In order to determine whether the first switching device is the target switching device or not, the method in the embodiment further includes that:

it is judged whether the first ID corresponding to the first switching device is identical to the first target ID or not; and when NO, a first access device in access devices connected with the first switching device is selected as an information synchronization device to enable the first switching device to perform information synchronization with the target switching device through the information synchronization device.

In the embodiment, when YES, the first switching device is controlled to enable the first switching device to implement an information synchronization process with all devices in the switching network corresponding to the first switching device.

In the embodiment, the first suspected target ID sent to the first switching device by the first access device is identical to the first target ID, that is, the first access device is a device connected with the target switching device, so that the first switching device may implement an information synchronization process with the target switching device through the first access device.

In the embodiment, after the first switching device implements information synchronization with the first access device, the method further includes that:

the first target ID is sent to another access device, except the information synchronization device, connected with the first switching device to enable the another access device except the information synchronization device to implement an information synchronization process with the target switching device through the first target ID.

In the embodiment, the first switching device may directly control an information synchronization path of the second switching device, and specifically, the method further includes that:

the first switching device sends a control instruction to the second switching device through the access device, the control instruction being arranged to control the second switching device to implement an information synchronization process with the target switching device through path information in the control instruction.

In the embodiment, the first switching device may merely send the path information to the second switching device for the second switching device to select, and specifically, the method further includes that:

the first switching device sends the control instruction to the second switching device through the access device to enable the second switching device to determine an information synchronization path according to the path information in the control instruction.

Specifically, the second switching device may implement the information synchronization process with the target switching device through the information synchronization path. The information synchronization path is a path for finally reaching the target switching device through the access device and the first switching device. During the practical application, the information synchronization path may be an optimal path, such as a shortest path.

During the practical application, for ensuring that information synchronization is a unidirectional process and avoid a risk in mutual synchronization, in the embodiment of the disclosure, the first switching device may send first path information to the other access device except the information synchronization device at the same time of sending the first target ID to the other access device except the information synchronization device, the first path information including the first ID corresponding to the first switching device and level information corresponding to the first switching device, so that the other access device except the information synchronization device may conveniently implement information synchronization with the target switching device.

Here, the level information is level information corresponding to a device. Specifically, after initial synchronization level information is set for the target switching device, level information of a device capable of implementing information synchronization with the target switching device is set to be first level information, level information of a switching device capable of implementing synchronization with the target switching device through an access device is set to be second level information, and in a similar manner, all the devices in the switching device have their own levels. Therefore, information synchronization is performed according to the level information to achieve a purpose of level-by-level information synchronization, and the risk in mutual synchronization is avoided.

Or, the level information may be level information corresponding to a path, i.e. level information corresponding to a path from a device to the target switching device. When a corresponding path from each device to the target switching device is not unique, the unique path of a lower path level is selected as an information synchronization path, so that the purpose of level-by-level information synchronization is achieved, and the risk in mutual synchronization is avoided.

Figure 4:
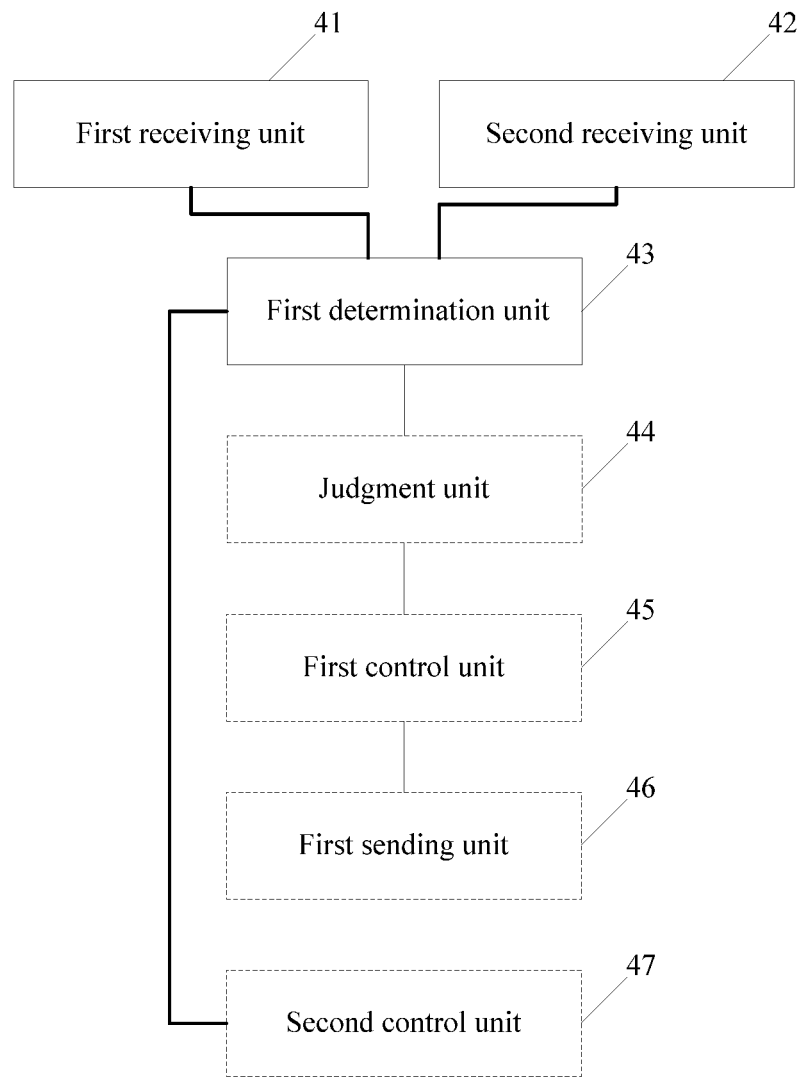
FIG. 4 is a structure diagram of a first switching device according to an embodiment of the disclosure.

For implementing the method of embodiment one, the embodiments of the disclosure provide a first switching device. As shown in FIG. 4, the first switching device includes a first receiving unit 41, a second receiving unit 42 and a first determination unit 43.

The first receiving unit 41 is arranged to receive a first suspected target ID, the first suspected target ID being an ID corresponding to a suspected target switching device determined by an access device connected with the first switching device according to a first ID.

The second receiving unit 42 is arranged to receive a second suspected target ID sent by a second switching device through the access device, the second suspected target ID being an ID corresponding to a suspected target switching device determined by the second switching device.

The first determination unit 43 is arranged to determine a first target ID according to the first suspected target ID and the second suspected target ID, the first target ID being an ID corresponding to a target switching device.

In the embodiment, the first switching device further includes a judgment unit 44 and a first control unit 45.

The judgment unit 44 is arranged to judge whether the first ID corresponding to the first switching device is identical to the first target ID or not.

The first control unit 45 is arranged to, when the first ID is not identical to the first target ID, select a first access device in access devices connected with the first switching device as an information synchronization device to enable the first switching device to perform information synchronization with the target switching device through the information synchronization device.

In the embodiment, the first switching device further includes a first sending unit 46.

The first sending unit 46 is arranged to send the first target ID to another access device, except the information synchronization device, connected with the first switching device to enable the other access device except the information synchronization device to implement an information synchronization process with the target switching device through the first target ID.

In the embodiment, the first switching device further includes a second control unit 47.

The second control unit 47 is arranged to send a control instruction to the second switching device through the access device, the control instruction being arranged to control the second switching device to implement an information synchronization process with the target switching device through path information in the control instruction.

In the embodiment, the second control unit 47 is further arranged to send the control instruction to the second switching device through the access device to enable the second switching device to determine an information synchronization path according to the path information in the control instruction.

Those skilled in the art should know that a function of each processing unit in the first switching device of the embodiment of the disclosure may be understood with reference to related descriptions in the control method and will not be elaborated herein.

During a practical application, the first receiving unit 41, the second receiving unit 42, the first determination unit 43, the judgment unit 44, the first control unit 45, the first sending unit 46 and the second control unit 47 may all be implemented by a Central Processing Unit (CPU), a Digital Signal Processor (DSP), a Field Programmable Gate Array (FPGA) and the like, and the CPU, the DSP and the FPGA may all be arranged in the first switching device.

The embodiment of the disclosure further provides a first computer-readable storage medium, which includes a set of instructions, the instructions being arranged to execute the switching network synchronization method of embodiment one.

Embodiment Two

Figure 5:
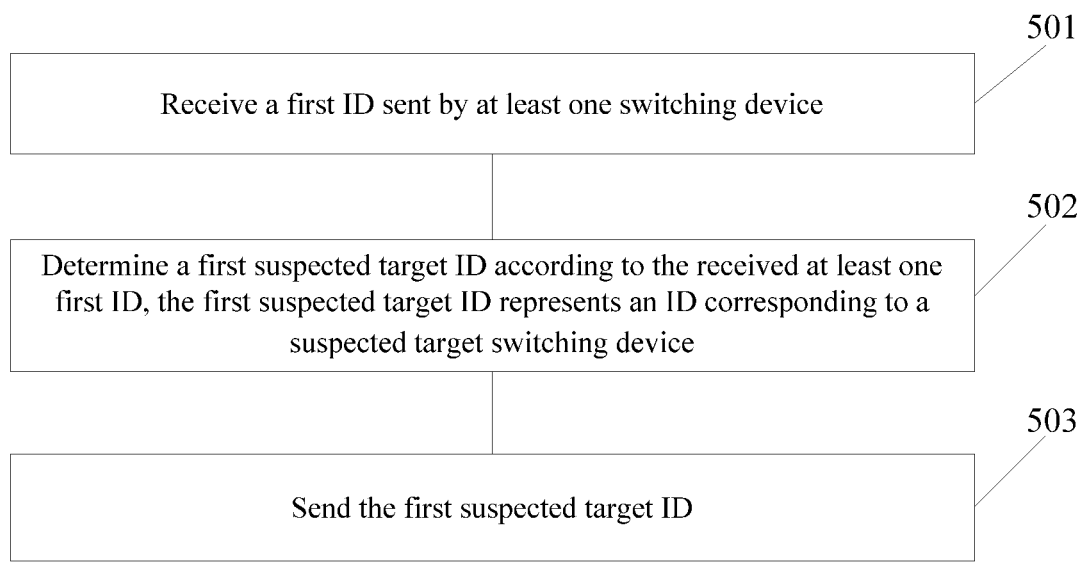
FIG. 5 is a second implementation flowchart of a switching network synchronization method according to an embodiment of the disclosure.

FIG. 5 is a second implementation flowchart of a switching network synchronization method according to an embodiment of the disclosure. The method is applied to an access device. The access device is connected with at least one switching device. As shown in FIG. 5, the method includes the following steps.

In Step 501, a first ID sent by at least tone switching device is received.

In Step 502, a first suspected target ID is determined according to the received at least one first ID, the first suspected target ID being arranged to represent an ID corresponding to a suspected target switching device.

In the embodiment, a first switching device sends its own first ID to at least one access device connected with it. Since the access device is not only connected with the first switching device, and during a practical application, the access device may be connected with multiple switching devices, the access device may receive a first ID sent by at least one switching device, and when the access device receives the at least one first ID, selects the first suspected target ID from all the received first ID according to a first preset rule, and further sends the selected first suspected target ID to the switching device connected with it, i.e. the first switching device, and then the first switching device may acquire the first suspected target ID. Here, the first preset rule may specifically be an ID minimum principle, and specifically, the access device selects the minimum ID from all the received first ID as the first suspected target ID.

In Step 503, the first suspected target ID is sent.

In the embodiment, the access device sends the first suspected target ID to the switching devices connected with it, i.e. the first switching device, after determining the first suspected target ID, so that a foundation is laid for the switching device to determine a unique target switching device corresponding to a switching network.

In the embodiment, the method further includes that:

a first target ID sent by a switching device is received, the first target ID being arranged to represent an ID corresponding to a target switching device; and the access device is controlled to implement an information synchronization process with the target switching device through the first target ID.

During the practical application, the access device may directly implement the information synchronization process with the switching device. For example, when the access device is directly connected with the target switching device, the access device may directly perform information synchronization with the target switching device.

Or, when being the first access device of embodiment one, the access device implements information synchronization with the first switching device to further implement information synchronization with the target switching device to achieve a purpose of assisting information synchronization of the first switching device and the target switching device.

Or, when the switching device is the other access device except the information synchronization device in embodiment one, at this moment, first path information may be received at the same time when the first target ID sent by the switching device is received, the first path information including the first ID corresponding to the switching device and level information corresponding to the switching device, for example, including the first ID corresponding to the first switching device and level information corresponding to the first switching device, so that the other access device except the information synchronization device may conveniently implement information synchronization with the target switching device, and moreover, a risk in mutual synchronization may be avoided.

Here, the level information is level information corresponding to a device. Specifically, after initial synchronization level information is set for the target switching device, level information of a device capable of implementing information synchronization with the target switching device is set to be first level information, level information of a switching device capable of implementing synchronization with the target switching device through an access device is set to be second level information, and in a similar manner, all the devices in the switching device have their own levels. Therefore, information synchronization is performed according to the level information to achieve a purpose of level-by-level information synchronization, and the risk in mutual synchronization is avoided.

Or, the level information may be level information corresponding to a path, i.e. level information corresponding to a path from a device to the target switching device. When a corresponding path from each device to the target switching device is not unique, the unique path of a lower path level is selected as an information synchronization path, so that the purpose of level-by-level information synchronization is achieved, and the risk in mutual synchronization is avoided.

Figure 6:
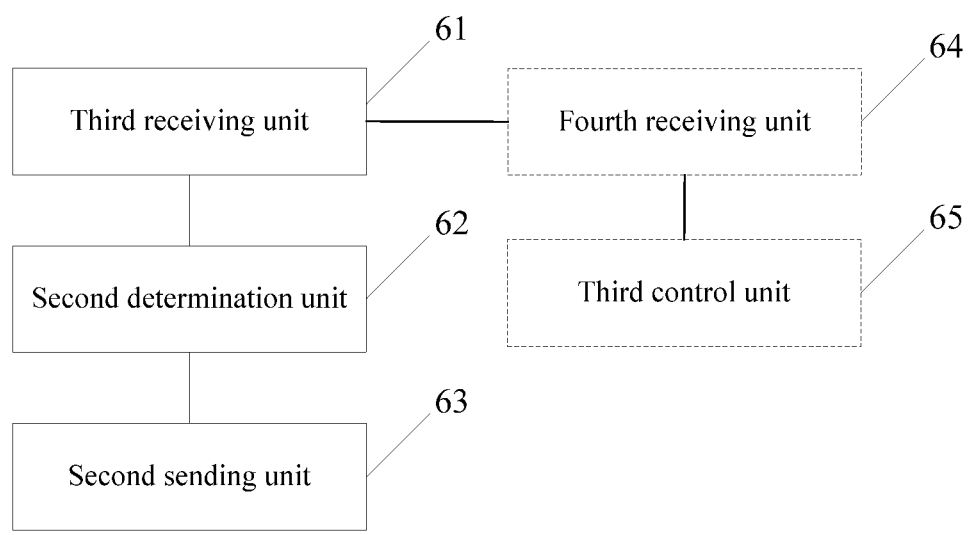
FIG. 6 is a structure diagram of an access device according to an embodiment of the disclosure.

For implementing the method of embodiment two, the embodiments of the disclosure further provide an access device. As shown in FIG. 6, the access device includes a third receiving unit 61, a second determination unit 62, and a second sending unit 63.

The third receiving unit 61 is arranged to receive a first ID sent by at least one switching device.

The second determination unit 62 is arranged to determine a first suspected target ID according to the received at least one first ID, the first suspected target ID being arranged to represent an ID corresponding to a suspected target switching device.

The second sending unit 63 is arranged to send the first suspected target ID.

In an embodiment, the access device further includes a fourth receiving unit 64 and a fourth receiving unit 64.

The fourth receiving unit 64 is arranged to receive a first target ID sent by a switching device, the first target ID being arranged to represent an ID corresponding to a target switching device.

The third control unit 65 is arranged to control the access device to implement an information synchronization process with the target switching device through the first target ID.

Those skilled in the art should know that a function of each processing unit in the access device of the embodiment of the disclosure may be understood with reference to related descriptions in the control method and will not be elaborated herein.

During a practical application, the third receiving unit 61, the second determination unit 62, the second sending unit 63, the fourth receiving unit 64 and the third control unit 65 may all be implemented by a CPU, a DSP, an FPGA and the like, and the CPU, the DSP and the FPGA may all be arranged in the access device.

The embodiment of the disclosure further provides a second computer-readable storage medium, which includes a set of instructions, the instructions being arranged to execute the switching network synchronization method of embodiment two.

Embodiment Three

Figure 7:
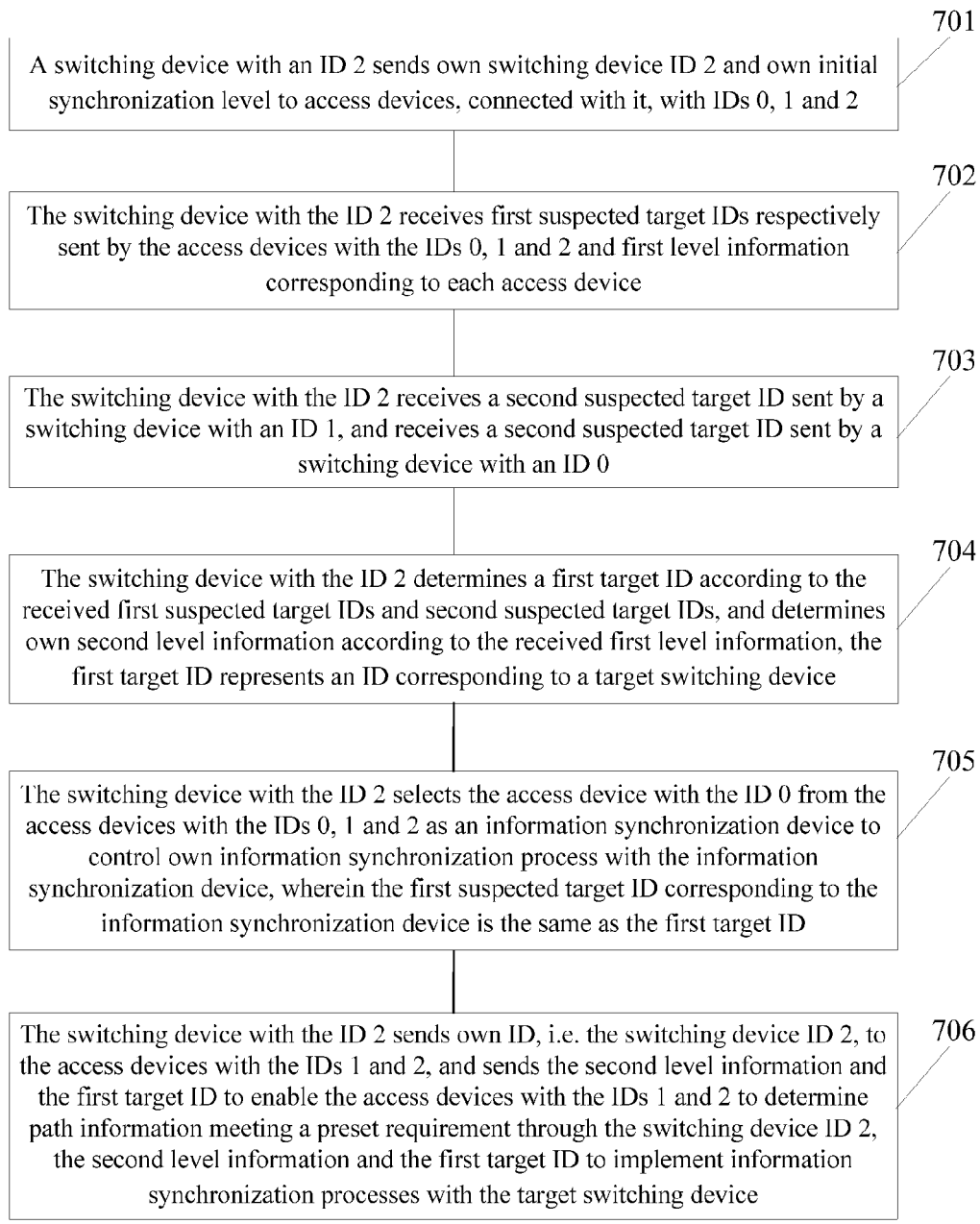
FIG. 7 is a specific implementation flowchart of a switching network synchronization method according to an embodiment of the disclosure.
Figure 8:
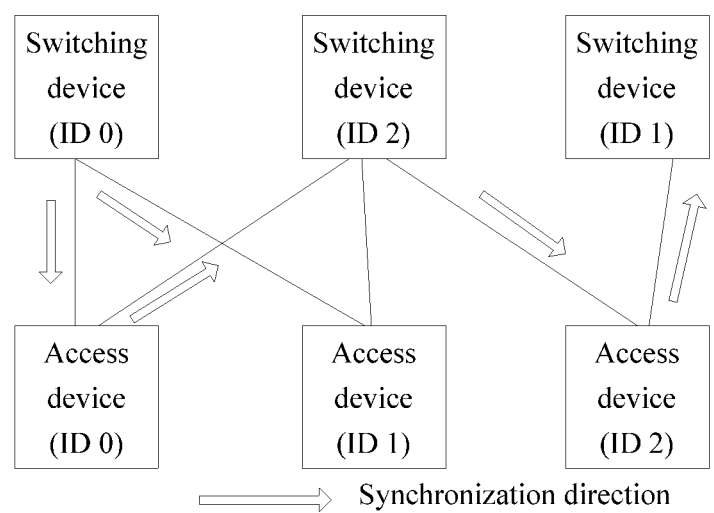
FIG. 8 is a schematic diagram of a synchronization direction of a single-stage switching network according to an embodiment of the disclosure.

FIG. 7 is a specific implementation flowchart of a switching network synchronization method according to an embodiment of the disclosure. FIG. 8 is a schematic diagram of a corresponding synchronization direction of a single-stage switching network according to an embodiment of the disclosure. The single-stage switching network includes three switching devices and three access devices, wherein own ID is set for each device; and specifically, the IDs corresponding to the three switching devices are: switching device ID 0, switching device ID 1 and switching device ID 2 respectively, and the IDs corresponding to the three access devices are: access device ID 0, access device ID 1 and access device ID 2 respectively. For example, for an information synchronization process of the switching device with the ID 2, as shown in FIG. 7 and FIG. 8, the method includes the following steps.

In Step 701, the switching device with the ID 2 sends its own switching device ID 2 and its own initial synchronization level to the access devices, connected with it, with the IDs 0, 1 and 2.

Specifically, in an initial state, if the three switching devices, i.e. none of the switching devices, receives synchronization information, each switching device in the three switching devices sends own switching device ID and the initial synchronization level of the switching device to the access devices connected with it. For example, the switching device with the ID 0 sends first synchronization information containing the switching device ID 0 and an initial synchronization level 0 to the access devices with the IDs 0 and 1; the switching device with the ID 2 sends first synchronization information containing the switching device ID 2 and the initial synchronization level 0 to the access devices with the IDs 0, 1 and 2; the switching device with the ID 1 sends first synchronization information containing the switching device ID 1 and the initial synchronization level 0 to the access device with the ID 2; at this moment, the first synchronization information received by the access device with the ID 0 includes: the switching device ID 0 and the switching device ID 2; the first synchronization information received by the access device with the ID 1 includes: the switching device ID 0 and the switching device ID 2; and the first synchronization information received by the access device with the ID 2 includes: the switching device ID 1 and the switching device ID 2.

Furthermore, each access device in the three access devices determines a first suspected target ID according to the switching device IDs contained in the received first synchronization information, and contains the first suspected target ID in second synchronization information for sending to the switching devices connected with the access device.

Here, after receiving the initial synchronization level, the access device sets its own level information to be first level information according to the initial synchronization level, and sends its own first level information to the switching device to enable the switching device to determine path information meeting a preset condition according to the level information to implement an information synchronization process with a target switching device.

Specifically, a preset rule is an ID minimum principle. For example, the access device with the ID 0 selects the minimum switching device ID 0 from the received switching device ID 0 and switching device ID 2 as the first suspected target ID, and sends the second synchronization information containing the first suspected target ID, namely containing the switching device ID 0, to the switching devices with the IDs 0 and 2. Here, the access device with the ID 0 sets its own level information to be first level information to represent first-level synchronization according to the initial synchronization level 0, and simultaneously contains the first level information in the second synchronization information for sending to the switching devices connected with the access device with the ID 0, i.e. the switching devices with the IDs 0 and 2.

Similarly, the access device with the ID 1 selects the minimum switching device ID 0 from the received switching device ID 0 and switching device ID 2 as the first suspected target ID, simultaneously sets own level information to be first level information to represent first-level synchronization according to the initial synchronization level 0, and further sends the second synchronization information containing the first suspected target ID, namely containing the switching device ID 0 and the first level information, to the switching devices with the IDs 0 and 2.

The access device with the ID 2 selects the minimum switching device ID 1 from the received switching device ID 1 and switching device ID 2 as the first suspected target ID, simultaneously sets its own level information to be first level information to represent first-level synchronization according to the initial synchronization level 0, and further sends the second synchronization information containing the first suspected target ID, namely containing the switching device ID 1 and the first level information, to the switching devices with the IDs 1 and 2.

In Step 702, the switching device with the ID 2 receives first suspected target IDs respectively sent by the access devices with the IDs 0, 1 and 2 and first level information corresponding to each access device.

In Step 703, the switching device with the ID 2 receives a second suspected target ID sent by the switching device with the ID 1, and receives a second suspected target ID sent by the switching device with the ID 0.

Here, for example, a switching device determines a second suspected target ID according to the ID minimum principle. The switching device with the ID 1 receives the first suspected target ID, i.e. the switching device ID 1, sent by the access device with the ID 2. Since the switching device with the ID 1 is only connected with the access device with the ID 2, the switching device with the ID 1 only receives a first suspected target ID, and the switching device with the ID 1 selects the switching device ID 1 as a second suspected target ID, and sends the second suspected target ID to the switching device with the ID 2 through the access device with the ID 2.

Similarly, the switching device with the ID 0 sends a second suspected target ID, i.e. the switching device ID 0, selected by itself to the switching device with the ID 2 through the access device with the ID 0 or the access device with the ID 1.

In Step 704, the switching device with the ID 2 determines a first target ID according to the received first suspected target IDs and second suspected target IDs, and determines its own second level information according to the received first level information, the first target ID being arranged to represent an ID corresponding to a target switching device.

In the embodiment, for example, according to the ID minimum principle, the first target ID selected by the switching device with the ID 2 is the switching device ID 0.

In Step 705, the switching device with the ID 2 selects the access device with the ID 0 from the access devices with the IDs 0, 1 and 2 as an information synchronization device to control own information synchronization process with the information synchronization device, wherein the first suspected target ID corresponding to the information synchronization device is identical to the first target ID.

In the embodiment, the switching device with the ID 2 may acquire IDs of sending parties according to the received first suspected target IDs. Specifically, the switching device with the ID 2 may acquire the access device ID 0, access device ID 1 and access device ID 2 corresponding to the access devices with the IDs 0, 1 and 2, and select the device corresponding to the access device ID 0 from the access device ID 0, the access device ID 1 and the access device ID 2 as the information synchronization device according to the ID minimum principle. Here, the first suspected target ID determined by the access device selected by the switching device with the ID 2 is required to be identical to the first target ID. That is, the first suspected target ID determined by the access device with the ID 0 is required to be identical to the first target ID, and thus the switching device with the ID 2 may implement the information synchronization process with the target switching device through the access device with the ID 0.

In the embodiment, the switching device with the ID 2 may also set its own level information to be second level information according to the received first level information, so that the second level information may be sent to the other access devices which do not perform information synchronization, and the other access devices may determine its own path information according to the level information, thereby implementing information synchronization processes with the target switching device.

In Step 706, the switching device with the ID 2 sends its own ID, i.e. the switching device ID 2, to the access devices with the IDs 1 and 2, and sends the second level information and the first target ID to enable the access devices with the IDs 1 and 2 to determine path information meeting a preset requirement through the switching device ID 2, the second level information and the first target ID to implement information synchronization processes with the target switching device.

In the embodiment, paths capable of reaching the target switching device in the access device with the ID 1 include: the switching device ID 0 and the initial synchronization level 0, and the switching device ID 2 and the second level information. Therefore, the access device with the ID 1 selects an optimal path, i.e. the switching device ID 0 and the initial synchronization level 0, to implement the information synchronization process with the target switching device.

Similarly, the only path capable of reaching the target switching device in the access device with the ID 2 is: the switching device ID 2 and the second level information. Therefore, the access device with the ID 2 selects the path corresponding to the switching device ID 2 and the second level information to implement the information synchronization process with the target switching device. Specifically, the access device with the ID 2 implements the information synchronization process with the target switching device with the ID 0 through the switching device with the ID 2 and the access device with the ID 0.

Furthermore, the switching device with the ID 1 implements the information synchronization process with the target switching device through the access device with the ID 2, the switching device with the ID 2 and the access device with the ID 0.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the implementation mode of the embodiment of the disclosure. It should be pointed out that those skilled in the art may further make a plurality of improvements and embellishments without departing from the principle of the embodiment of the disclosure, and these improvements and embellishments shall also fall within the scope of protection of the disclosure.

INDUSTRIAL APPLICABILITY

According to the embodiments of the disclosure, the first suspected target ID is received through the first switching device, the second suspected target ID sent by the second switching device is received through the access device, and the first target ID is determined according to the first suspected target ID and the second suspected target ID, the first target ID being the ID corresponding to the target switching device, so that a purpose of enabling the first switching device to receive the second suspected target ID sent by the other switching device is achieved, the first switching device may further conveniently determine the unique first target ID corresponding to a switching network, and a foundation is laid for information synchronization of all devices in the switching network.

The invention claimed is:

1. A switching network synchronization method, applied to a first switching device, the method comprising:
   receiving a first suspected target Identity (ID), the first suspected target ID being an ID corresponding to a suspected target switching device determined by an access device connected with the first switching device according to a first ID;
   receiving a second suspected target ID sent by a second switching device through the access device, the second suspected target ID being an ID corresponding to a suspected target switching device determined by the second switching device; and
   determining a first target ID according to the first suspected target ID and the second suspected target ID, the first target ID being an ID corresponding to a target switching device; the method further comprising:
   judging whether the first ID corresponding to the first switching device is identical to the first target ID or not; and
   when the first ID is not identical to the first target ID, selecting a first access device, from access devices connected with the first switching device, as an information synchronization device, to enable the first switching device to perform information synchronization with the target switching device through the information synchronization device.

2. The method according to claim 1, further comprising:
   sending the first target ID to another access device, wherein the another access device is not the information synchronization device, connected with the first switching device to enable the another access device to implement an information synchronization process with the target switching device through the first target ID.

3. The method according to claim 1, further comprising:
   sending, by the first switching device, a control instruction to the second switching device through the access device, the control instruction being arranged to control the second switching device to implement an information synchronization process with the target switching device through path information in the control instruction.

4. The method according to claim 1, further comprising:
   sending, by the first switching device, a control instruction to the second switching device through the access device to enable the second switching device to determine an information synchronization path according to the path information in the control instruction.

5. A switching network synchronization method, applied to an access device, the method comprising:
   receiving a first Identity (ID) sent by at least one switching device;
   determining a first suspected target ID according to the received at least one first ID, the first suspected target ID being arranged to represent an ID corresponding to a suspected target switching device; and
   sending the first suspected target ID, the method further comprising:
   receiving a first target ID sent by a switching device of the at least one switching device, the first target ID being arranged to represent an ID corresponding to a target switching device; and
   controlling the access device to implement an information synchronization process with the target switching device through the first target ID.

6. A first switching device, comprising:
   a processor; and
   a memory storing instructions executable by the processor,
   wherein the processor is arranged to:
   receive a first suspected target Identity (ID), the first suspected target ID being an ID corresponding to a suspected target switching device determined by an access device connected with the first switching device according to a first ID;
   receive a second suspected target ID sent by a second switching device through the access device, the second suspected target ID being an ID corresponding to a suspected target switching device determined by the second switching device; and
   determine a first target ID according to the first suspected target ID and the second suspected target ID, the first target ID being an ID corresponding to a target switching device; wherein the processor is further arranged to:
   judge whether the first ID corresponding to the first switching device is identical to the first target ID or not; and
   when the first ID is not identical to the first target ID, select a first access device in access devices connected with the first switching device as an information synchronization device to enable the first switching device to perform information synchronization with the target switching device through the information synchronization device.

7. The first switching device according to claim 6, wherein the processor is further arranged to:
   send the first target ID to another access device, wherein the another access device is not the information synchronization device, connected with the first switching device to enable the other access device to implement an information synchronization process with the target switching device through the first target ID.

8. The first switching device according to claim 6, wherein the processor is further arranged to:
   send a control instruction to the second switching device through the access device, the control instruction being arranged to control the second switching device to implement an information synchronization process with the target switching device through path information in the control instruction.

9. The first switching device according to claim 8, wherein the processor is further arranged to send the control instruction to the second switching device through the access device to enable the second switching device to determine an information synchronization path according to the path information in the control instruction.

10. An access device, comprising:
    a processor; and
    a memory storing instructions executable by the processor, wherein the processor is arranged to:
    receive a first Identity (ID) sent by at least one switching device;
    determine a first suspected target ID according to the received at least one first ID, the first suspected target ID being arranged to represent an ID corresponding to a suspected target switching device; and send the first suspected target ID, wherein the processor is further arranged to:

receive a first target ID sent by a switching device of the at least one switching device, the first target ID being arranged to represent an ID corresponding to a target switching device; and control the access device to implement an information synchronization process with the target switching device through the first target ID.

* * * * *